United States Patent
D'Alo et al.

(10) Patent No.: US 11,841,516 B2
(45) Date of Patent: Dec. 12, 2023

(54) ANAMORPHIC RECEIVER OPTICAL DESIGN FOR LIDAR LINE SENSORS

(71) Applicant: LG INNOTEK CO., LTD., Seoul (KR)

(72) Inventors: Richard S. D'Alo, San Jose, CA (US); Chris J. Trowbridge, Dexter, MI (US)

(73) Assignee: LG INNOTEK CO., LTD., Seoul (KR)

( * ) Notice: Subject to any disclaimer, the term of this patent is extended or adjusted under 35 U.S.C. 154(b) by 433 days.

(21) Appl. No.: 17/097,386

(22) Filed: Nov. 13, 2020

(65) Prior Publication Data

US 2022/0155497 A1    May 19, 2022

(51) Int. Cl.
| | |
|---|---|
| *G01S 7/48* | (2006.01) |
| *G02B 3/10* | (2006.01) |
| *G02B 3/06* | (2006.01) |
| *G02B 27/00* | (2006.01) |
| *G01S 17/10* | (2020.01) |
| *G01S 7/481* | (2006.01) |

(Continued)

(52) U.S. Cl.
CPC ............. *G02B 3/10* (2013.01); *G01S 7/481* (2013.01); *G01S 17/10* (2013.01); *G01S 17/931* (2020.01); *G02B 3/06* (2013.01); *G02B 27/0081* (2013.01); *G05D 1/0231* (2013.01)

(58) Field of Classification Search
None
See application file for complete search history.

(56) References Cited

U.S. PATENT DOCUMENTS

| | | |
|---|---|---|
| 3,990,785 A | 11/1976 | Hirose |
| RE47,134 E | 11/2018 | Mimeault |

(Continued)

FOREIGN PATENT DOCUMENTS

| | | |
|---|---|---|
| CN | 110554370 A | 12/2019 |
| CN | 209765040 U | 12/2019 |

(Continued)

OTHER PUBLICATIONS

Blais et al. "Calibration of an Anamorphic Laser Based 3-D Range Sensor", Optical Science, Engineering and Instrumentation '97, Jul. 7, 1997, pp. 113-122, Proceedings vol. 3174, Videometrics V, SPIE, Bellingham, Washington.

(Continued)

*Primary Examiner* — Hovhannes Baghdasaryan
(74) *Attorney, Agent, or Firm* — Birch, Stewart, Kolasch & Birch, LLP

(57) ABSTRACT

Devices, systems, and methods are provided for using a light detection and ranging (LIDAR) receiver optical design. A vehicle anamorphic LIDAR system may include a group of rotationally symmetric lenses, a first cylindrical lens, and a second cylindrical lens, wherein the first cylindrical lens is arranged between the group of rotationally symmetric lenses and the second cylindrical lens, wherein the vehicle anamorphic LIDAR system is associated with a first focal length in a first direction associated with a scene field of view, and a second focal length in a second direction perpendicular to the first direction and associated with an instantaneous field of view, and wherein the first focal length is different than the second focal length.

20 Claims, 6 Drawing Sheets

(51) Int. Cl.
*G01S 17/931* (2020.01)
*G05D 1/02* (2020.01)

(56) References Cited

U.S. PATENT DOCUMENTS

| | | |
|---|---|---|
| 2002/0135831 A1* | 9/2002 | Park ..................... G02B 13/10 359/27 |
| 2011/0228249 A1 | 9/2011 | Koehler et al. |
| 2014/0009747 A1 | 1/2014 | Suzuki et al. |
| 2018/0052234 A1 | 2/2018 | Upton et al. |
| 2019/0018108 A1 | 1/2019 | Gao et al. |
| 2020/0096615 A1 | 3/2020 | Upton et al. |
| 2020/0158827 A1 | 5/2020 | Hasselbach |
| 2020/0191959 A1 | 6/2020 | Zheng et al. |

FOREIGN PATENT DOCUMENTS

| | | |
|---|---|---|
| WO | 2015098130 A1 | 7/2015 |
| WO | 2019219970 A1 | 11/2019 |

OTHER PUBLICATIONS

International Searching Authority: Korean International Property Office, International Search Report of PCT/US2021/057516 dated Feb. 23, 2022, 3 pages.
International Searching Authority: Korean International Property Office, Written Opinion of PCT/US2021/057516 dated Feb. 23, 2022, 4 pages.

* cited by examiner

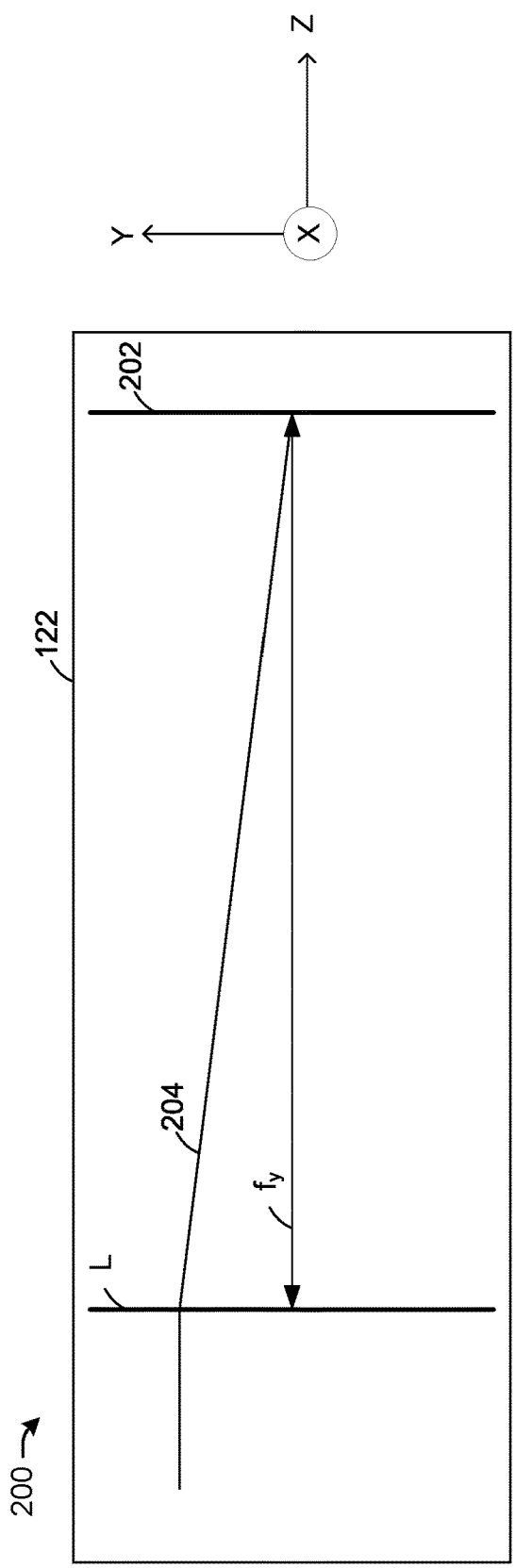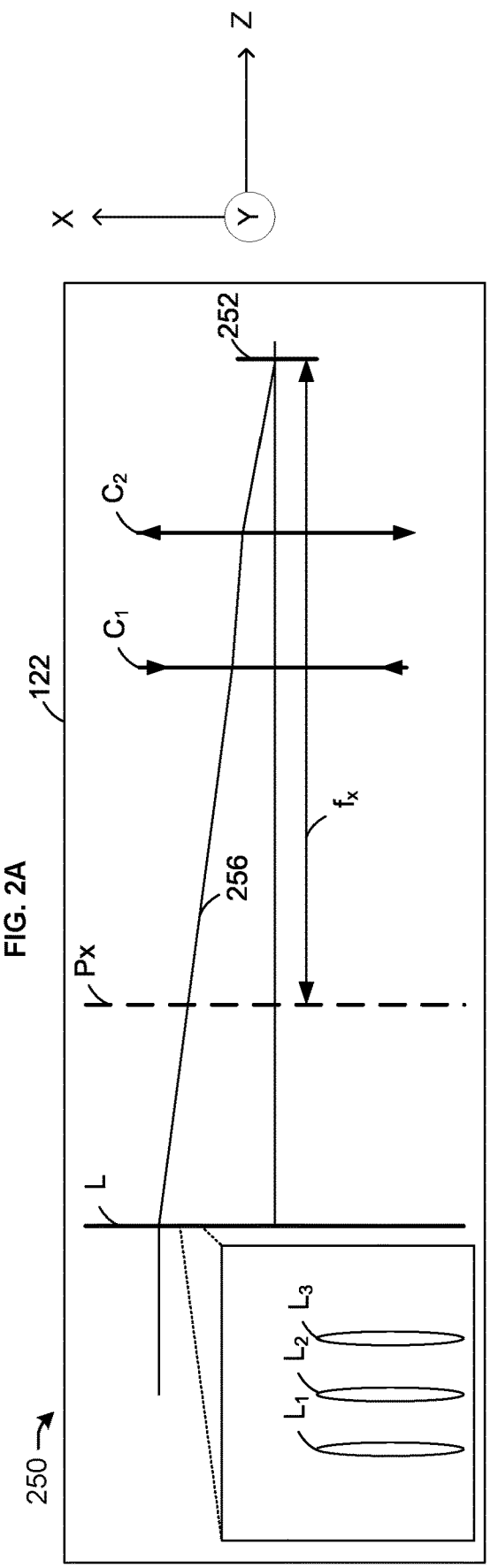

280

290

ANAMORPHIC RECEIVER OPTICAL DESIGN FOR LIDAR LINE SENSORS

TECHNICAL FIELD

This disclosure generally relates to systems, methods, and devices for optical design.

BACKGROUND

Some vehicles are equipped with a sensor system to collect data relating to the current and developing state of the vehicle's surroundings. The proper performance of a vehicle depends on the accuracy data collected by the sensors in the sensor system. The sensor system may comprise radars, visual spectrum cameras, laser-ranging devices (LIDARs), thermal sensors, or other types of sensors.

However, it may be difficult to differentiate one field-of-view of a LIDAR sensor from another field of view of the LIDAR sensor.

BRIEF DESCRIPTION OF THE DRAWINGS

FIG. 2A depicts an illustrative schematic diagram for a light detection and ranging (LIDAR) receiver optical design from a side view, in accordance with one or more example embodiments of the present disclosure.

FIG. 2B depicts an illustrative schematic diagram for a LIDAR receiver optical design of FIG. 2A from a top view, in accordance with one or more example embodiments of the present disclosure.

Figure 1:
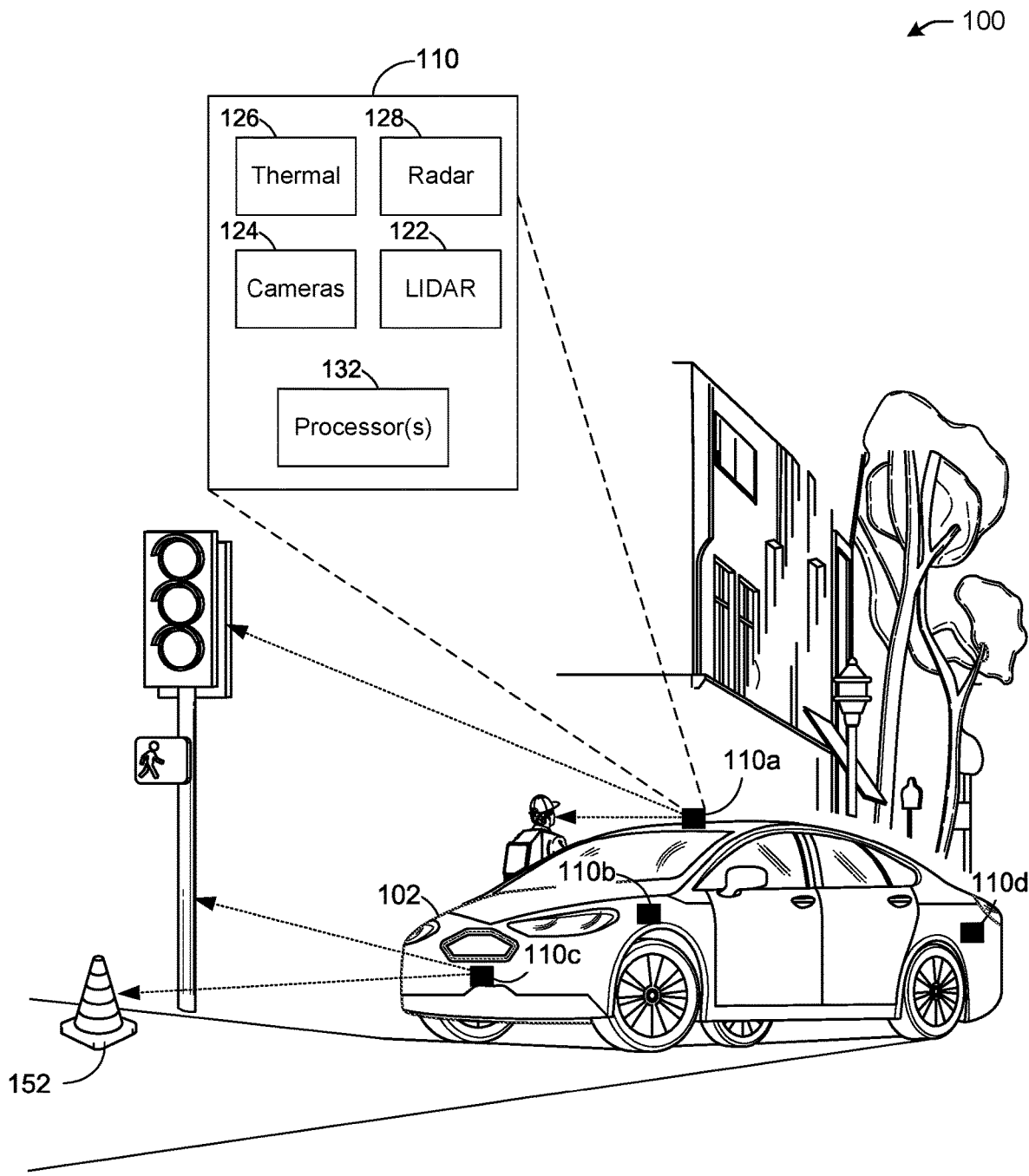
FIG. 1 illustrates an example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include light detection and ranging (LIDAR) sensors, stereo cameras, radar sensors, thermal sensors, or other sensors attached to an autonomous vehicle. These sensors may be originally used in a lab environment in order to perform high precision analyses of their performance under certain conditions. Autonomous vehicles may be driven in the real world and rely on the attached sensors to perform to a certain performance level under environmental factors. As the autonomous vehicles are driven in the real world, sensors such as LIDAR rely on accurate detection of signals reflected from objects in the vicinity of the autonomous vehicle.

A LIDAR receiver (e.g., sensor) may have multi-dimensional detection capabilities (e.g., scanning or non-scanning), resulting in fields-of-view (FOVs) in multiple directions, such as horizontal and vertical directions. A LIDAR system may determine the range (e.g., distance) to an object within the system's FOV. To generate a data set of multi-dimensional coordinates (e.g., X-Y-Z coordinates), a LIDAR system may emit a laser in multiple directions in a desired FOV. LIDAR systems may use lenses to create FOVs in multiple directions. In particular, a lens focal length defines a FOV of the lens, so a LIDAR system's FOVs may be based on the focal length of any lenses used by the LIDAR system. For example, the shorter the focal length, the wider the FOV of a lens.

A scene FOV for a LIDAR receiver may refer to the largest area that the LIDAR receiver may detect at a distance (e.g., the FOV in one direction). An instantaneous FOV (IFOV), also referred to as spatial resolution, may be the smallest detail within the FOV that may be detected at a set distance (e.g., the FOV in another direction). For example, a vehicle LIDAR receiver may detect a roadside sign at a distance from the vehicle, but may not be able to read the sign without a strong enough IFOV. In this manner, the scene FOV may refer to a first axial direction from the sensor/receiver, and the IFOV may refer to a second axial direction from the sensor/receiver (e.g., perpendicular to the first axial direction).

LIDAR systems may have requirements for vertical FOVs and for horizontal FOVs to satisfy requirements for a scene field-of-view, angular resolution, and coupling of the transmitted laser beam profile to the LIDAR receiver. Some LIDAR receiver lens designs use lenses that are rotationally symmetric about the optical axis to allow for straightforward manufacturing processes to be used. Rotationally symmetric lenses (e.g., non-anamorphic lenses) have a focal length that may be the same in both the horizontal and vertical direction, so the vertical and horizontal FOVs view may be chosen independently. For LIDAR systems that use line sensors, the FOV associated with the long direction may correspond to the scene FOV, and the short direction may correspond to the IFOV. For such types of LIDAR systems, this may result in a conflict in the required scene FOV and the desired IFOV needed to maximize field coupling between the transmitter and receiver, as well as minimize background noise seen by the receiver that is not from the transmitted beam.

Therefore, an enhanced optical design of anamorphic LIDAR receivers may be beneficial.

Example embodiments described herein provide certain systems, methods, and devices for enhanced optical design of anamorphic LIDAR receivers.

In one or more embodiments, an enhanced optical design of anamorphic LIDAR receivers may include one or more non-anamorphic lenses (e.g., a single lens or a multi-lens group) and one or more anamorphic lenses, the anamorphic lenses having focal lengths that may be different in the vertical and horizontal directions, but with the image plane in the same position. In contrast, the non-anamorphic lenses may have horizontal and vertical FOVs both determined by the focal length of the lens (e.g., the same focal length in both the horizontal and vertical directions). Anamorphic lenses may be challenging to design, test, and manufacture, in addition to being cost-prohibitive for high volume manufacturing. For LIDAR systems that use line sensors, an anamorphic lens may be designed using multiple cylindrical lenses in addition to one or more rotationally symmetric lenses. A cylindrical lens may refer to a special lens that only has optical refractive power along one axis, and may be more easily designed, manufactured, and sourced than a complicated general freeform optic. By using a pair of cylindrical lenses and a rotationally symmetric lens or lens group, the vertical and horizontal FOVs of the sensor may be independently designed without sacrificing image quality.

In one or more embodiments, the FOV corresponding to the long direction of the sensor may be controlled by the focal length of the rotationally symmetric lens group, and the IFOV corresponding to the short direction of the sensor would be controlled by appropriately designing a pair of cylindrical lenses. A pair of cylindrical lenses may be used, with one cylindrical lens having a positive optical power (e.g., positive focal length) and the other cylindrical lens having a negative optical power (e.g., negative focal length). The positioning and order of the cylindrical lenses with respect to the sensor and the rotationally symmetric lens(es) may determines if the focal length in the short direction of the line sensor is larger or smaller than the focal length in the long direction of the sensor, and the individual focal lengths are designed to keep the focal plane in the same position for both the long and short directions.

An advantage to the proposed design is the spatial extent of one dimension of a line sensor is much smaller than the other, so a full custom anamorphic lens design is not needed. Using the proposed design may allow for the FOV in the long direction to be designed and image quality to be optimized with a standard rotationally symmetric lens, and the IFOV in the short direction to be designed independently without the need for challenging custom anamorphic lenses. The proposed design has the benefit of also being able to independently change the IFOV after the rotationally symmetric lens design has been completed, which will allow for IFOV design changes without changing the optics that control the FOV. In addition, using spherical surfaces on cylindrical lenses may reduce implementation complexity (e.g., compared to toroidal or other types of surfaces), and may provide image quality comparable to a rotationally symmetric lens design that does not use the cylindrical lenses. However, the present disclosure is not limited to the use of cylindrical lenses with spherical profiles, and other types of lenses may be used. For example, cylindrical lenses with aspheric profiles (e.g., acylinder lenses) may be used.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

Referring to FIG. 1, there is shown a vehicle 102 having a sensor system 110 for a plurality of cameras, emitters, and sensors. The sensor system 110 may be connected to the vehicle 102. In this environment 100, there is shown that sensor system 110 includes sensors such as sensors 110a, 110b, 110c, and 110d. It should be noted that other sensors not shown in this figure may also be attached to the vehicle 102 and that the sensors 110a, 110b, 110c, and 110d are used for illustrative purposes. These sensors may detect objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122 (e.g., LIDAR emitters and sensors/receivers). Some examples of a LIDAR may include Geiger mode LIDAR, line-mode LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processors 132. The one or more processors 132 may control the transmission and reception of signals using the LIDAR 122, the cameras 124, the thermal sensor 126, and the radar 128. The various sensors of the sensor system 110, when calibrated correctly, should indicate a proper distance and shape of object 152.

In one or more embodiments, the sensor system 110 may emit multiple LIDAR pulses. The reflection of the pulses may result in return signals that may be used by the sensor system 110 to detect an object distance (e.g., the reflection of the pulses caused by the object), for example, using the time-of-flight of an emitted LIDAR pulse and the corresponding return signal. The LIDAR 122 receiver (e.g., sensor) may include lenses, the design of which is described further with respect to FIGS. 2A-2C.

In one or more embodiments, the lenses of the LIDAR 122 receiver may be used to create FOVs in multiple directions. In particular, LIDAR sensor (e.g., receiver) dimension and a lens focal length define a FOV of the lens, so a LIDAR system's FOVs may be based on the focal length of any lenses used by the LIDAR system. For example, the shorter the focal length, the wider the FOV of a lens. In this manner, by using a combination of anamorphic and non-anamorphic lenses, the LIDAR 122 receiver may be anamorphic, allowing for an IFOV that is greater than or less than the scene FOV.

It is understood that the above descriptions are for purposes of illustration and are not meant to be limiting.

FIG. 2A depicts an illustrative schematic diagram 200 for a LIDAR receiver optical design from a side view, in accordance with one or more example embodiments of the present disclosure.

Figure 2C:
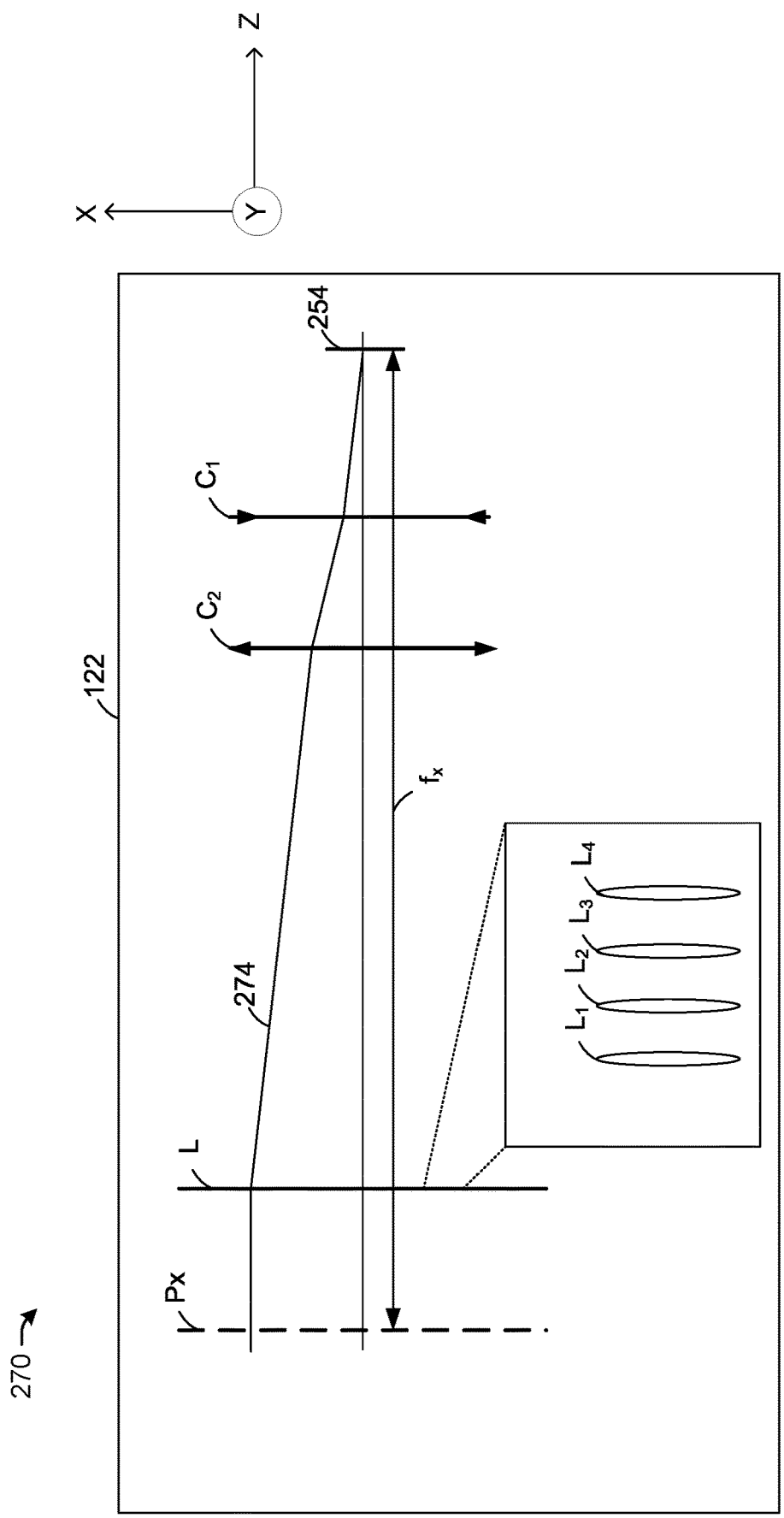
FIG. 2C depicts an illustrative schematic diagram for the LIDAR receiver optical design of FIG. 2A from a top view, in accordance with one or more example embodiments of the present disclosure.

Referring to FIG. 2A, schematic diagram 200 may be included in the LIDAR 122 of FIG. 1 (e.g., a LIDAR line sensor). In particular, the schematic diagram 200 may represent a side view of the LIDAR 122 (e.g., the X-axis going into the page). The schematic diagram 200 may include lens L (e.g., representing a rotationally symmetric lens group), which may be designed to provide a LIDAR system focal length $f_y$ along the Y-axis. The long-direction 202 of the LIDAR 122 may correspond to a scene FOV based on the received LIDAR reflection 204. The lens L may refract the LIDAR reflection 204. The IFOV of the LIDAR 122 may be increased or decreased by implementing the designs shown in FIG. 2B and FIG. 2C, respectively.

FIG. 2B depicts an illustrative schematic diagram 250 for a LIDAR receiver optical design of FIG. 2A from a top view, in accordance with one or more example embodiments of the present disclosure. The schematic diagram 250 represents an optical design that may increase the IFOV of the LIDAR receiver 201 of FIG. 2A.

Referring to FIG. 2B, two cylindrical lenses—$C_1$ and $C_2$—may be positioned next to the lens L along the Z-axis. Lens $C_1$ may be a negative cylindrical lens, and lens $C_2$ may be a positive cylindrical lens. The IFOV may be increased by shortening the focal length $f_x$ along the X-axis (e.g., making the focal length $f_x$ shorter than the focal length $f_y$ along the Y-axis in FIG. 2A). To make the focal length $f_x$ shorter than the focal length $f_y$ along the Y-axis in FIG. 2A, the two cylindrical lenses may be positioned so that lens $C_1$ as a negative lens is positioned in between the lens L and lens $C_2$ as the positive lens. A rear principal plane Px may represent the principal plane in the X-direction. The narrow direction 252 may refer to the X-axis direction of the LIDAR 122. As shown, the IFOV may be increased (e.g., based on the refractions of the received LIDAR reflection 256 by the lens L, the lens $C_1$, and the lens $C_2$).

In one or more embodiments, the lens L may include multiple lenses (L1, L2, L3, etc.) that may include any combination of positive and/or negative rotationally symmetric lenses.

FIG. 2C depicts an illustrative schematic diagram 270 for the LIDAR receiver optical design of FIG. 2A from a top view, in accordance with one or more example embodiments of the present disclosure.

Referring to FIG. 2C, the two cylindrical lenses—$C_1$ and $C_2$—may be positioned next to the lens L along the Z-axis. However, the positions of lenses $C_1$ and $C_2$ may be switched with respect to their positions in FIG. 2B, thereby increasing the focal length $f_x$ along the X-axis to be longer than the focal length $f_y$ along the Y-axis in FIG. 2A. To make the focal length $f_x$ longer than the focal length $f_y$ along the Y-axis in FIG. 2A, the two cylindrical lenses may be positioned so that lens $C_2$ as a positive lens is positioned in between the lens L and lens $C_1$ as the negative lens. A rear principal plane Px may represent the principal plane in the X-direction. The narrow direction 252 may refer to the X-axis direction of the LIDAR 122. As shown, the IFOV may be decreased (e.g., based on the refractions of the received LIDAR reflection 274 by the lens L, the lens $C_1$, and the lens $C_2$).

In one or more embodiments, the lens L may include multiple lenses (L1, L2, L3, L4, etc.) that may include any combination of positive and/or negative rotationally symmetric lenses. The number, types (e.g., convex or concave), and/or arrangement of the group of lenses L in FIG. 2C may be the same as or different than the number, types, and/or arrangement of the lenses of lens L in FIG. 2B. Any number of convex and or concave lenses may be used in the arrangement of the lenses of lens L depending on the number of lenses in the group of lenses L.

Referring to FIGS. 2A-2C, to maintain rotational symmetric of the lenses of lens L (when lens L is a lens group), when the lenses are anamorphic, an oblong aperture shape may be required, as a circular aperture may result in an f-number that is not rotationally symmetric.

Still referring to FIGS. 2A-2C, the LIDAR 122 of FIG. 1 whose lenses are represented by FIGS. 2A-2C may be anamorphic. However, the anamorphic LIDAR sensor of the LIDAR 122 may use the rotationally symmetric lens group L, which by definition is non-anamorphic because rotationally symmetric lenses have the same focal length $f_x$ and focal length $f_y$ (e.g., the same focal lengths in axially perpendicular directions). To allow for the LIDAR 122 to be anamorphic, the cylindrical lenses C1 and C2 may be added to the design to either increase or decrease focal length G (e.g., increase or decrease IFOV).

Figures 2D, 2E:
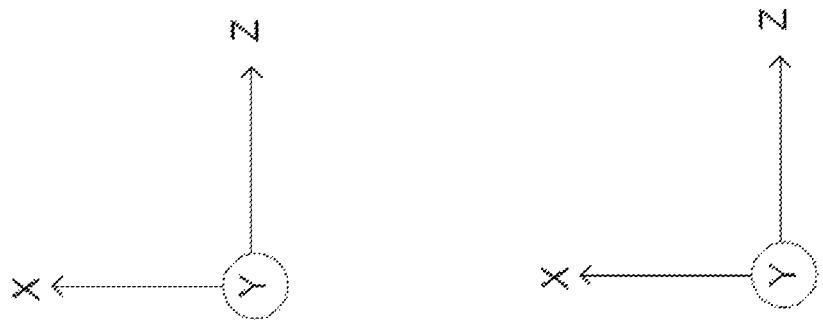
FIG. 2D depicts an illustrative schematic diagram for the LIDAR receiver optical design of FIG. 2A from a top view, in accordance with one or more example embodiments of the present disclosure.
FIG. 2E depicts an illustrative schematic diagram for the LIDAR receiver optical design of FIG. 2A from a top view, in accordance with one or more example embodiments of the present disclosure.

FIG. 2D depicts an illustrative schematic diagram 280 for the LIDAR receiver optical design of FIG. 2A from a top view, in accordance with one or more example embodiments of the present disclosure.

Referring to FIG. 2D, the schematic diagram 280 shows a lens design that may be used for any of the lenses in FIGS. 2A-2C. The lens design shown by the schematic diagram 280 is a convex cylindrical lens.

FIG. 2E depicts an illustrative schematic diagram 290 for the LIDAR receiver optical design of FIG. 2A from a top view, in accordance with one or more example embodiments of the present disclosure.

Referring to FIG. 2E the schematic diagram 290 shows a lens design that may be used for any of the lenses in FIGS. 2A-2C. The lens design shown by the schematic diagram 290 is a concave cylindrical lens.

Referring to FIGS. 2A-2E, any of the lens assemblies (e.g., using lenses L1, L2, and/or L3, etc.) may include an aperture stop that may have an elliptical shape to keep the F-number of any lens the same in both the horizontal (e.g., Z-direction) and vertical directions (e.g., X-direction).

It is understood that the above descriptions are for purposes of illustration and are not meant to be limiting.

It is understood that the above descriptions are for purposes of illustration and are not meant to be limiting.

Figure 3:
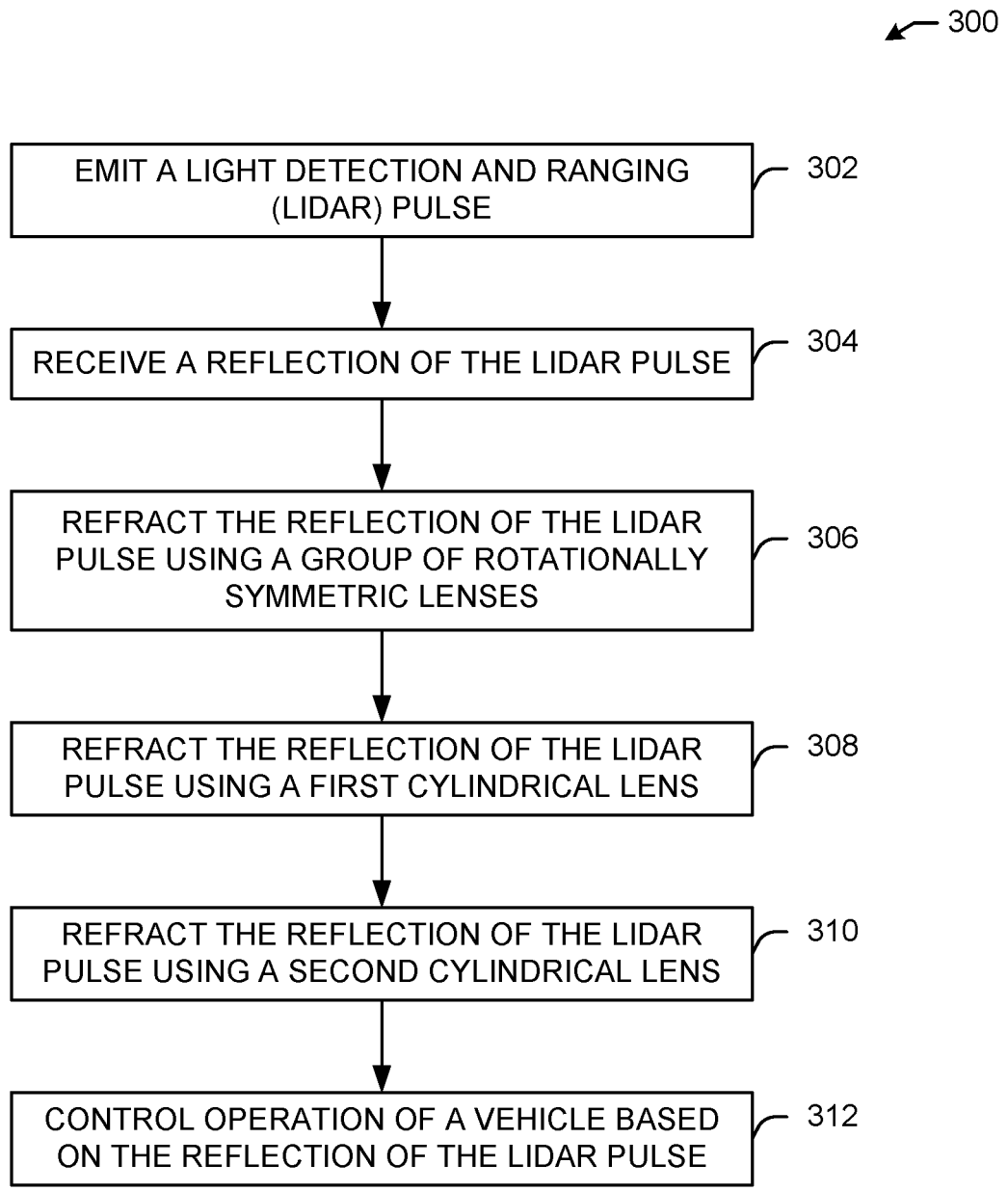
FIG. 3 illustrates a flow diagram of a process for using a LIDAR receiver optical design, in accordance with one or more example embodiments of the present disclosure.

FIG. 3 illustrates a flow diagram of a process 300 for using a LIDAR receiver optical design, in accordance with one or more example embodiments of the present disclosure.

At block 302, a system (or device, e.g., the LIDAR 122 of FIGS. 1-2C) may emit a LIDAR pulse (e.g., as shown in FIG. 1). The LIDAR pulse may reflect off of an object (e.g., the object 152 of FIG. 1), and the reflection of the LIDAR pulse may return to the system. Using time-of-flight, the system may determine the distance of the object from the system (e.g., because of the known speed of light).

At block 304, when the reflection of the LIDAR pulse returns to the system, the system may receive the reflection of the LIDAR pulse (e.g., using a LIDAR sensor/receiver). The system may be an anamorphic LIDAR sensor with multiple lenses used to refract the reflection of the LIDAR pulse, thereby resulting in different focal lengths in the horizontal and vertical directions.

At block 306, the system may refract the received reflection of the LIDAR pulse using a group of rotationally symmetric lenses (e.g., the lens group L of FIGS. 2A-2C). By definition, the group of rotationally symmetric lenses may be non-anamorphic, and therefore the focal lengths (and associated scene FOV in the longer axial direction and IFOV in the shorter axial direction) may be the same. Therefore, to make the system anamorphic, the system may include additional lenses.

At block 308, the system may refract the received reflection of the LIDAR pulse using a first cylindrical lens (e.g., lens $C_1$ in FIG. 2B, lens $C_2$ in FIG. 2C). The first cylindrical lens may be positioned between the group of rotationally symmetric lenses and a second cylindrical lens (e.g., along the Z-axis as shown in FIGS. 2A-2C, representing the axis about which the group of rotationally symmetric lenses are rotationally symmetric). To make the focal length shorter in the shorter direction (e.g., the horizontal direction) than the focal length in the longer direction (e.g., the vertical direction), and therefore increase the IFOV with respect to the scene FOV, the first cylindrical lens may be a negative (e.g., concave) lens (e.g., as shown in FIG. 2E). To make the focal length longer in the shorter direction (e.g., the horizontal direction) than the focal length in the longer direction (e.g., the vertical direction), and therefore decrease the IFOV with respect to the scene FOV, the first cylindrical lens may be a positive (e.g., convex) lens (e.g., as shown in FIG. 2D).

At block 310, the system may refract the received reflection of the LIDAR pulse using a second cylindrical lens (e.g., lens $C_2$ in FIG. 2B, lens $C_1$ in FIG. 2C). The first cylindrical lens may be positioned between the group of rotationally symmetric lenses and the second cylindrical lens (e.g., along the Z-axis as shown in FIGS. 2A-2C, representing the axis about which the group of rotationally symmetric lenses are rotationally symmetric). To make the focal length shorter in the shorter direction (e.g., the horizontal direction) than the focal length in the longer direction (e.g., the vertical direction), and therefore increase the IFOV with respect to the scene FOV, the first cylindrical lens may be a positive (e.g., convex) lens (e.g., as shown in FIG. 2D). To make the focal length longer in the shorter direction (e.g., the horizontal direction) than the focal length in the longer direction (e.g., the vertical direction), and therefore decrease the IFOV with respect to the scene FOV, the first cylindrical lens may be a negative (e.g., concave) lens (e.g., as shown in FIG. 2E).

At block 312, based on the refractions of the received reflection of the LIDAR pulse using the different lenses of the system, the system may control operation of a vehicle (e.g., the vehicle 102 of FIG. 1). For example, using time-of-flight of the emitted LIDAR pulse and the received reflection of the LIDAR pulse, and the speed of light, the system may determine, based on the time-of-flight, the distance to the object that caused the reflection of the LIDAR pulse. Based on the object distance from the system, the system may determine velocity, acceleration, and/or direction for the vehicle (e.g., speeding up, slowing down, changing direction, etc.).

It is understood that the above descriptions are for purposes of illustration and are not meant to be limiting.

Figure 4:
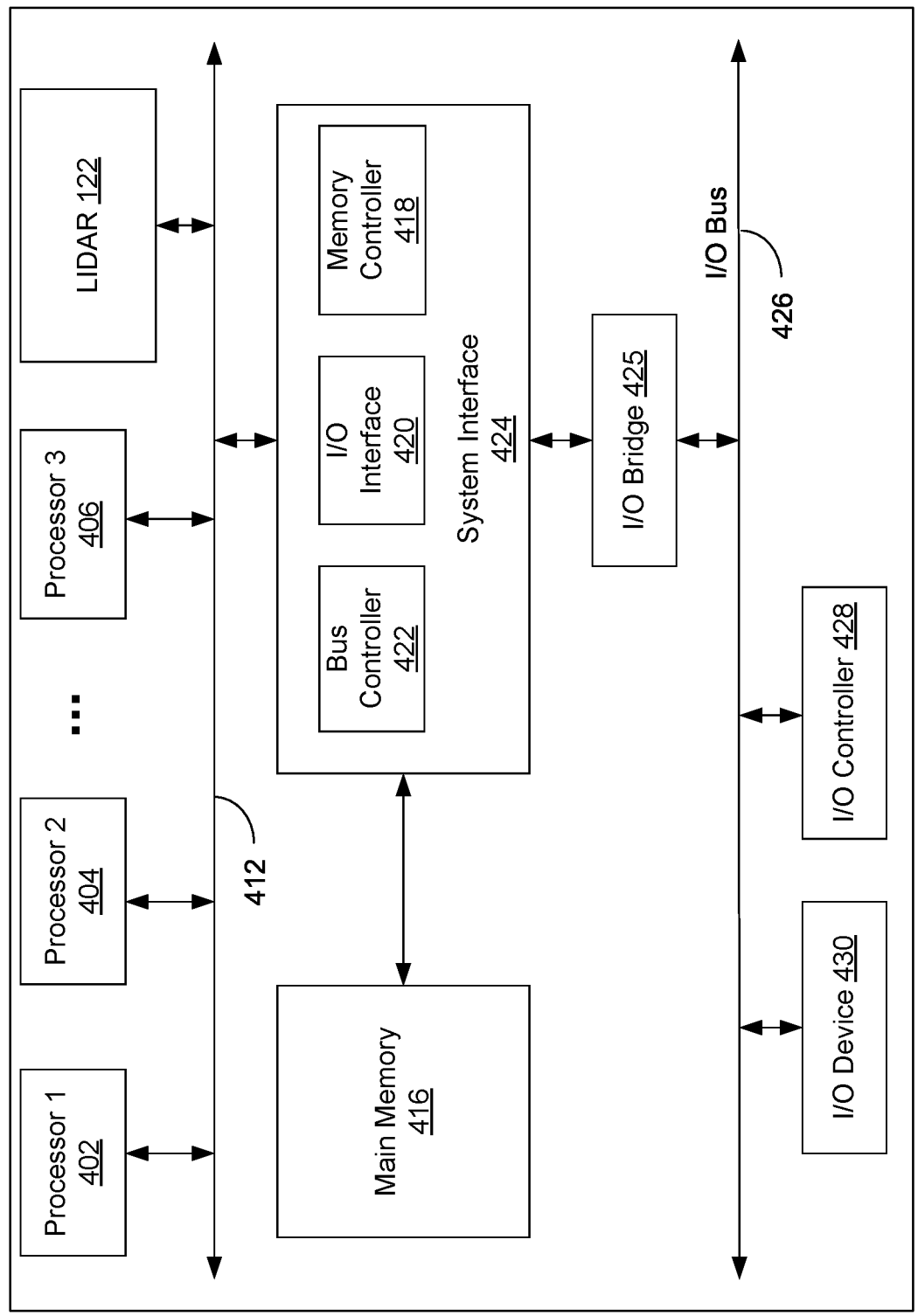
FIG. 4 is a block diagram illustrating an example of a computing device or computer system upon which any of one or more techniques (e.g., methods) may be performed, in accordance with one or more example embodiments of the present disclosure.

FIG. 4 is a block diagram illustrating an example of a computing device or computer system 400 upon which any of one or more techniques (e.g., methods) may be performed, in accordance with one or more example embodiments of the present disclosure.

For example, the computing system 400 of FIG. 4 may represent the sensor system 110 of FIG. 1, and therefore may facilitate the emission, reception, and processing of pulses. The computer system (system) includes one or more processors 402-406. Processors 402-406 may include one or more internal levels of cache (not shown) and a bus controller (e.g., bus controller 422) or bus interface (e.g., I/O interface 420) unit to direct interaction with the processor bus 412. The LIDAR 122 of FIG. 1 may also be in communication with the Processors 402-406 and may be connected to the processor bus 412.

Processor bus 412, also known as the host bus or the front side bus, may be used to couple the processors 402-406 and/or the LIDAR 122 with the system interface 424. System interface 424 may be connected to the processor bus 412 to interface other components of the system 400 with the processor bus 412. For example, system interface 424 may include a memory controller 418 for interfacing a main memory 416 with the processor bus 412. The main memory 416 typically includes one or more memory cards and a control circuit (not shown). System interface 424 may also include an input/output (I/O) interface 420 to interface one or more I/O bridges 425 or I/O devices 430 with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406 and/or the LIDAR 122. Another type of user input device includes cursor control, such as a mouse, a trackball, or cursor direction keys for communicating direction information and command selections to the processors 402-406 and/or the LIDAR 122 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406 and/or the LIDAR 122. Main memory 416 also may be used for storing temporary variables or other intermediate information during execution of instructions by the processors 402-406 and/or the LIDAR 122. System 400 may include read-only memory (ROM) and/or other static storage device coupled to the processor bus 412 for storing static information and instructions for the processors 402-406 and/or the LIDAR 122. The system outlined in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 and/or the LIDAR 122 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 416, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. An anamorphic light detection and ranging (LIDAR) device comprising:
   a group of rotationally symmetric lenses;
   a first cylindrical lens; and
   a second cylindrical lens,
   wherein the first cylindrical lens is arranged between the group of rotationally symmetric lenses and the second cylindrical lens on an optical axis,
   wherein a distance between the first cylindrical lens and second cylindrical lens on the optical axis is less than a distance between the first cylindrical lens and the group of rotationally symmetric lenses, and
   wherein the anamorphic LIDAR device is associated with a first focal length in a first direction associated with a scene field of view, and a second focal length in a second direction perpendicular to the first direction and associated with an instantaneous field of view, and wherein the first focal length is different than the second focal length.

2. The anamorphic LIDAR device of claim 1, wherein:
the first cylindrical lens is a negative lens,
the second cylindrical lens is a positive lens,
the first focal length is longer than the second focal length, and
wherein a length of the first direction of a LIDAR sensor is shorter than a length of the second direction of the LIDAR sensor.

3. The anamorphic LIDAR device of claim 1, wherein:
the first cylindrical lens is a positive lens,
the second cylindrical lens is a negative lens,
the first focal length is shorter than the second focal length, and
wherein a length of the first direction of a LIDAR sensor is shorter than a length of the second direction of the LIDAR sensor.

4. The anamorphic LIDAR device of claim 1, wherein the group of rotationally symmetric lenses consists of three lenses.

5. The anamorphic LIDAR device of claim 1, wherein the group of rotationally symmetric lenses consists of four lenses.

6. The anamorphic LIDAR device of claim 1, wherein the group of rotationally symmetric lenses comprises a convex lens and a concave lens.

7. The anamorphic LIDAR device of claim 1, wherein the first cylindrical lens comprises a first oblong aperture and the second cylindrical lens comprises a second oblong aperture, and
wherein a length of the first direction of a LIDAR sensor is shorter than a length of the second direction of the LIDAR sensor.

8. The anamorphic LIDAR device of claim 1, wherein the anamorphic LIDAR device is LIDAR line sensor associated with operation of a vehicle, and
wherein a length of the first direction of the LIDAR line sensor is shorter than a length of the second direction of the LIDAR line sensor.

9. A vehicle anamorphic light detection and ranging (LIDAR) system comprising:
a group of rotationally symmetric lenses;
a first cylindrical lens; and
a second cylindrical lens,
wherein the first cylindrical lens is arranged between the group of rotationally symmetric lenses and the second cylindrical lens on an optical axis,
wherein a distance between the first cylindrical lens and second cylindrical lens on the optical axis is less than a distance between the first cylindrical lens and the group of rotationally symmetric lenses,
wherein the vehicle anamorphic LIDAR system is associated with a first focal length in a first direction associated with a scene field of view, and a second focal length in a second direction perpendicular to the first direction and associated with an instantaneous field of view, and wherein the first focal length is different than the second focal length,
wherein the anamorphic LIDAR device includes LIDAR line sensor, and
wherein a length of the first direction of the LIDAR line sensor is different from a length of the second direction of the LIDAR line sensor.

10. The vehicle anamorphic LIDAR system of claim 9, wherein:
the first cylindrical lens is a negative lens,
the second cylindrical lens is a positive lens,
the first focal length is longer than the second focal length, and
wherein the length of the first direction of the LIDAR line sensor is shorter than the length of the second direction of the LIDAR line sensor.

11. The vehicle anamorphic LIDAR system of claim 9, wherein:
the first cylindrical lens is a positive lens,
the second cylindrical lens is a negative lens,
the first focal length is shorter than the second focal length, and
wherein the length of the first direction of the LIDAR line sensor is shorter than the length of the second direction of the LIDAR line sensor.

12. The vehicle anamorphic LIDAR system of claim 9, wherein the group of rotationally symmetric lenses consists of three lenses.

13. The vehicle anamorphic LIDAR system of claim 9, wherein the group of rotationally symmetric lenses consists of four lenses.

14. The vehicle anamorphic LIDAR system of claim 9, wherein the group of rotationally symmetric lenses comprises a convex lens and a concave lens.

15. The vehicle anamorphic LIDAR system of claim 9, wherein the first cylindrical lens comprises a first oblong aperture and the second cylindrical lens comprises a second oblong aperture.

16. A method for receiving light detection and ranging (LIDAR) signals, the method comprising:
emitting, by an anamorphic LIDAR system, a LIDAR pulse;
receiving, by the anamorphic LIDAR system, a reflection of the LIDAR pulse;
refracting, by a group of rotationally symmetric lenses of the anamorphic LIDAR system, the reflection of the LIDAR pulse;
refracting, by a first cylindrical lens of the anamorphic LIDAR system, the reflection of the LIDAR pulse; and
refracting, by a second cylindrical lens of the anamorphic LIDAR system, the reflection of the LIDAR pulse,
wherein the first cylindrical lens is arranged between the group of rotationally symmetric lenses and the second cylindrical lens on an optical axis,
wherein the anamorphic LIDAR system is associated with a first focal length in a first direction associated with a scene field of view, and a second focal length in a second direction perpendicular to the first direction and associated with an instantaneous field of view, and wherein the first focal length is different than the second focal length, and
wherein the group of rotationally symmetric lenses, the first cylindrical lens and the second cylindrical lens is aligned in a direction of the optical axis perpendicular to the first and second directions.

17. The method of claim 16, wherein the group of rotationally symmetric lenses consists of three cylindrical lenses, and wherein refracting the reflection of the LIDAR pulse by the group of rotationally symmetric lenses comprises refracting the reflection of the LIDAR pulse using a first rotationally symmetric lens, refracting the reflection of the LIDAR pulse using a second rotationally symmetric lens, and refracting the reflection of the LIDAR pulse using a third rotationally symmetric lens.

18. The method of claim 16, wherein the group of rotationally symmetric lenses consists of four lenses, and wherein refracting the reflection of the LIDAR pulse by the group of rotationally symmetric lenses comprises refracting the reflection of the LIDAR pulse using a first rotationally symmetric lens, refracting the reflection of the LIDAR pulse using a second rotationally symmetric lens, refracting the reflection of the LIDAR pulse using a third rotationally symmetric lens, and refracting the reflection of the LIDAR pulse using a fourth rotationally symmetric lens.

19. The method of claim 16, wherein the group of rotationally symmetric lenses comprises a convex lens and a concave lens, and rein refracting the reflection of the LIDAR pulse by the group of rotationally symmetric lenses comprises refracting the reflection of the LIDAR pulse using the convex lens and refracting the reflection of the LIDAR pulse using the concave lens.

20. The method of claim 16, further comprising controlling operation of a vehicle based on the reflection of the LIDAR pulse.

* * * * *